(12) United States Patent
Autere et al.

(10) Patent No.: US 12,710,636 B2
(45) Date of Patent: Aug. 18, 2026

(54) LASER ILLUMINATION FOR MICROSCOPE SYSTEM

(71) Applicant: Microsoft Technology Licensing, LLC, Redmond, WA (US)

(72) Inventors: Anton Viljami Autere, Jarvenpaa (FI); Simo Kaarlo Tapani Tammela, Espoo (FI); Esa Tapani Raikkonen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 18/464,016

(22) Filed: Sep. 8, 2023

(65) Prior Publication Data

US 2025/0085526 A1 Mar. 13, 2025

(51) Int. Cl.
*G02B 21/14* (2006.01)
*G02B 21/36* (2006.01)
*G02B 6/06* (2006.01)

(52) U.S. Cl.
CPC ............. *G02B 21/14* (2013.01); *G02B 21/36* (2013.01); *G02B 6/06* (2013.01)

(58) Field of Classification Search
CPC ...................... G02B 6/04–08; G02B 21/06–14
See application file for complete search history.

(56) References Cited

U.S. PATENT DOCUMENTS 6,249,381 B1 * 6/2001 Suganuma ........... G02B 27/149 385/115
6,347,173 B1 * 2/2002 Suganuma ............... G02B 6/04 385/115
2008/0037933 A1 * 2/2008 Furman .................... G02B 6/14 385/31
2018/0214021 A1 * 8/2018 Dos Santos .............. A61B 3/13
2022/0373779 A1 * 11/2022 Urashima .............. G02B 21/02

FOREIGN PATENT DOCUMENTS

JP H06167640 A * 6/1994 ............. G02B 27/48
JP 2000121836 A * 4/2000
WO WO-9940474 A1 * 8/1999 ............. G02B 6/264

OTHER PUBLICATIONS

English machine translation of JP-H06167640-A (Year: 1994).*

* cited by examiner

*Primary Examiner* — Nicholas R. Pasko
(74) *Attorney, Agent, or Firm* — Alleman Hall LLP

(57) ABSTRACT

A microscope system includes a laser light source to emit illumination light toward an observation sample. A plurality of optical fibers are disposed along an optical path between the laser light source and the observation sample, such that each optical fiber of the plurality of optical fibers propagates illumination light toward the observation sample. Each optical fiber of the plurality of optical fibers is longer than a coherence length of the illumination light. A first optical fiber of the plurality of optical fibers has a first length that differs from a second length of a second optical fiber by at least the coherence length.

18 Claims, 6 Drawing Sheets

LASER ILLUMINATION FOR MICROSCOPE SYSTEM

BACKGROUND

Microscopes typically include integrated light sources used to illuminate the sample under observation. Light emitting diodes (LEDs), incandescent lamps, and other incoherent light sources are commonly used.

"Phase contrast microscopes" are optical instruments used to enhance the contrast of transparent samples that are difficult to observe under traditional brightfield microscopy. The phase contrast microscope achieves this by exploiting the differences in refractive indices within the sample and its surrounding medium. Light waves passing through different parts of a sample undergo slight phase shifts due to variations in thickness and refractive index. These phase shifts are transformed into intensity variations that enhance the visibility of the sample in the resulting image.

SUMMARY

The present disclosure generally describes a microscope system in which illumination light from a laser light source is propagated toward an observation sample via a plurality of optical fibers. Each optical fiber is longer than a coherence length of the illumination light. The lengths of one or more of the plurality of optical fibers differ from one another—e.g., the length of a first optical fiber differs from the length of a second optical fiber by at least the coherence length of the illumination light.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
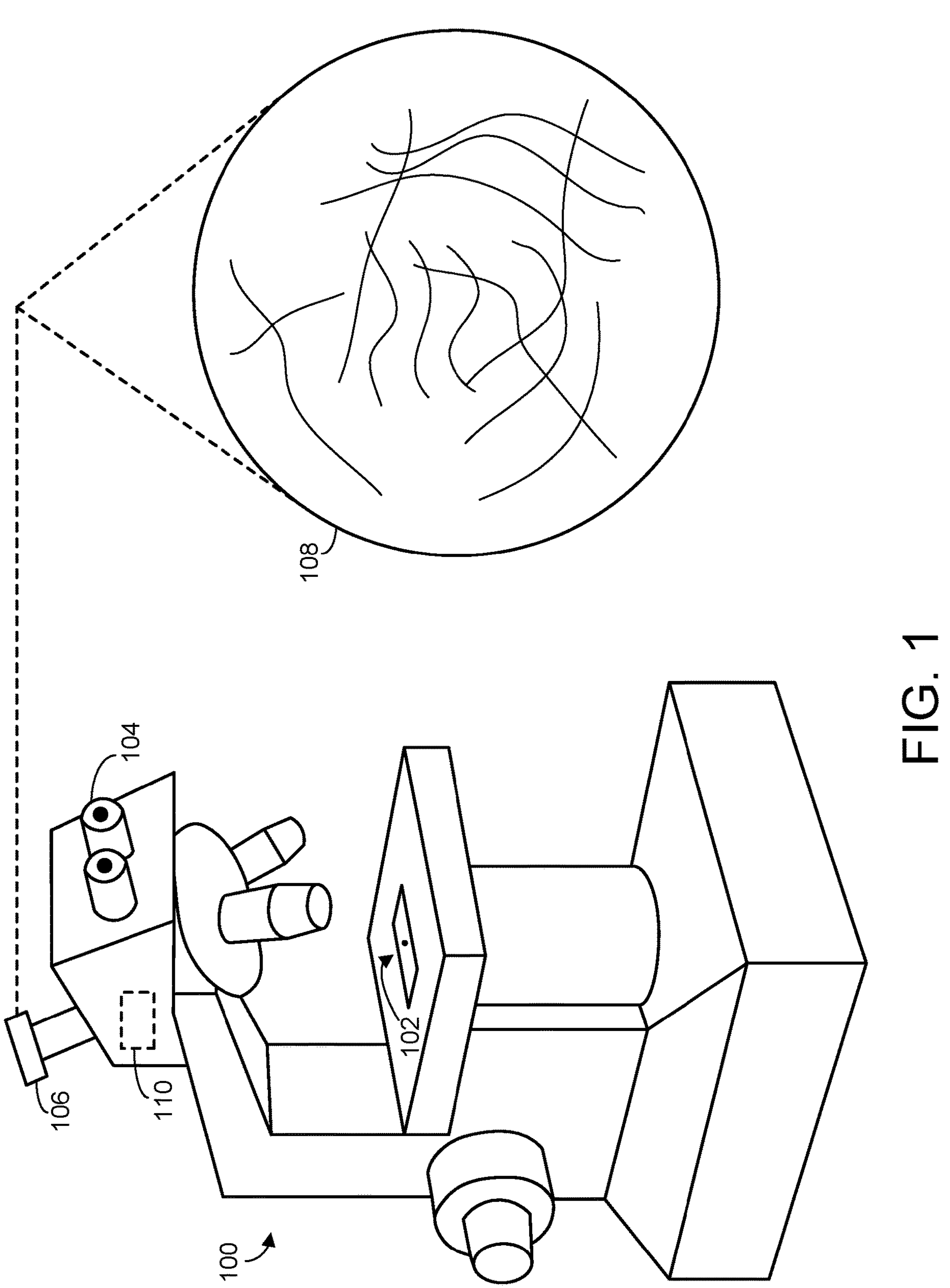
FIG. 1 schematically shows an example microscope system.

FIG. 1 schematically shows an example microscope system 100. The present disclosure primarily focuses on phase contrast microscopes—e.g., those that use optical arrangements to enhance the contrast of transparent samples. However, it will be understood that the techniques and arrangements described herein are applicable to any suitable type of microscope and/or other optical instrument. Microscope system 100 shown in FIG. 1 is highly simplified and schematic in nature. In particular, the design, capabilities, and specific appearance of microscope system 100 are non-limiting and not intended to correspond to any specific model or type of microscope.

In FIG. 1, microscope system 100 is used to provide magnification of an observation sample 102. In this example, the observation sample is directly viewable by a human observer through an eyepiece 104. Additionally, microscope system 100 includes a camera 106 to capture and output images of the observation sample. In FIG. 1, a simplified example image 108 is output by camera 106. The camera may have any capabilities suitable for use with a microscope system—e.g., the camera may have any suitable resolution, framerate, sensitivity, and/or other applicable imaging properties.

Microscope system 100 additionally includes a controller 110. The controller takes the form of any suitable computer logic hardware usable to control any or all computerized functions of the microscope system. As one example, the microscope system and controller may be implemented as computing system 700 and logic subsystem 702 described below with respect to FIG. 7. The controller may control operation of the camera system, control operation of an illumination light source, control motorized aspects of the microscope (e.g., for sample placement, focus adjustment), perform image processing operations on images captured by the camera, etc. It will be understood that the specific placement of controller 110 with regard to microscope system 100 in FIG. 1 is arbitrary and non-limiting. For instance, in another example, the controller may be external to the microscope system, and control operation of the microscope system via a suitable wired or wireless data connection.

Alternatively, in some examples, it will be understood that a "controller" need not be included. In other words, a microscope system as described herein need not include, or otherwise interface with, a controller or other computer logic hardware. Rather, any or all functions of microscope system are in some cases controlled manually by a human operator.

The methods described herein can in some examples be used for improving the performance of an optical data storage readout system with a transparent storage media. For instance, in some examples, an "observation sample" as described herein may be implemented as a transparent storage medium used for optical storage of computer data. The optical systems described herein facilitate higher quality imaging of such transparent storage media, resulting in improved performance of the data storage readout system.

Though not specifically shown in FIG. 1, microscopes often have integrated light sources used to illuminate the sample for observation. Such light sources sometimes include incoherent light sources, such as light-emitting diodes (LEDs) and/or incandescent lamps. By contrast, laser light sources potentially offer several advantages over incoherent light sources, such as the higher illumination intensity associated with lasers and the point-like nature of lasers. Higher illumination intensity can facilitate a shorter shutter time for image capture in time-resolved systems, resulting in a faster frame rate. Furthermore, the point-like nature of laser light sources makes them easier to integrate into the optical system of the microscope, as there is no need for a complicated collection and homogenization system to establish sufficient illumination throughput and uniformity. However, the high temporal coherence of laser illumination light often produces a random speckle pattern on the illuminated sample, which significantly degrades the image quality.

As such, the present disclosure is directed to systems and methods for microscopic imaging in which a laser light source emits illumination light toward an observation sample. The illumination light is propagated by a plurality of optical fibers in a manner that beneficially reduces the speckle pattern typically associated with laser light, as will be described in more detail below. In some examples, the optical fibers are bundled together as a bundle that has different cross-sectional profiles at the source-proximal end of the bundle and the sample-proximal end of the bundle. This can be used to produce a desired illumination profile for phase contrast microscopy (sometimes referred to as a "hollow cone of light) without use of an annulus, which improves light efficiency. In any case, the optical fibers are generally sized such that the length of each fiber is greater than the coherence length of the laser light source. Furthermore, in some examples, the lengths of the individual fibers may differ-one or more of the optical fibers may differ in length by at least the coherence length of the laser light source.

In this manner, the systems and methods described herein provide various technical benefits as compared to existing approaches for sample illumination in microscopy. For instance, the random speckle pattern typically associated with laser light sources is reduced while retaining the advantages of laser light, such as higher illumination intensity and ease of integration into an optical system. Furthermore, phase contrast microscopes often include an annulus that creates a desired illumination profile, but blocks a relatively large portion of the illumination light (e.g., 90%). The arrangements described herein beneficially allow the annulus to be omitted, thereby improving light efficiency. Other approaches to mitigating the speckle from laser light sources utilize complicated moving parts, such as a spinning diffuser or piezoelectric motor vibrating an optical filter. These require constant movement and an external power supply, and constrain the shortest possible shutter time. By contrast, the approaches described herein allow for an optical system that is cheaper and less complicated, while providing for higher framerate imaging and better light efficiency.

Figure 2:
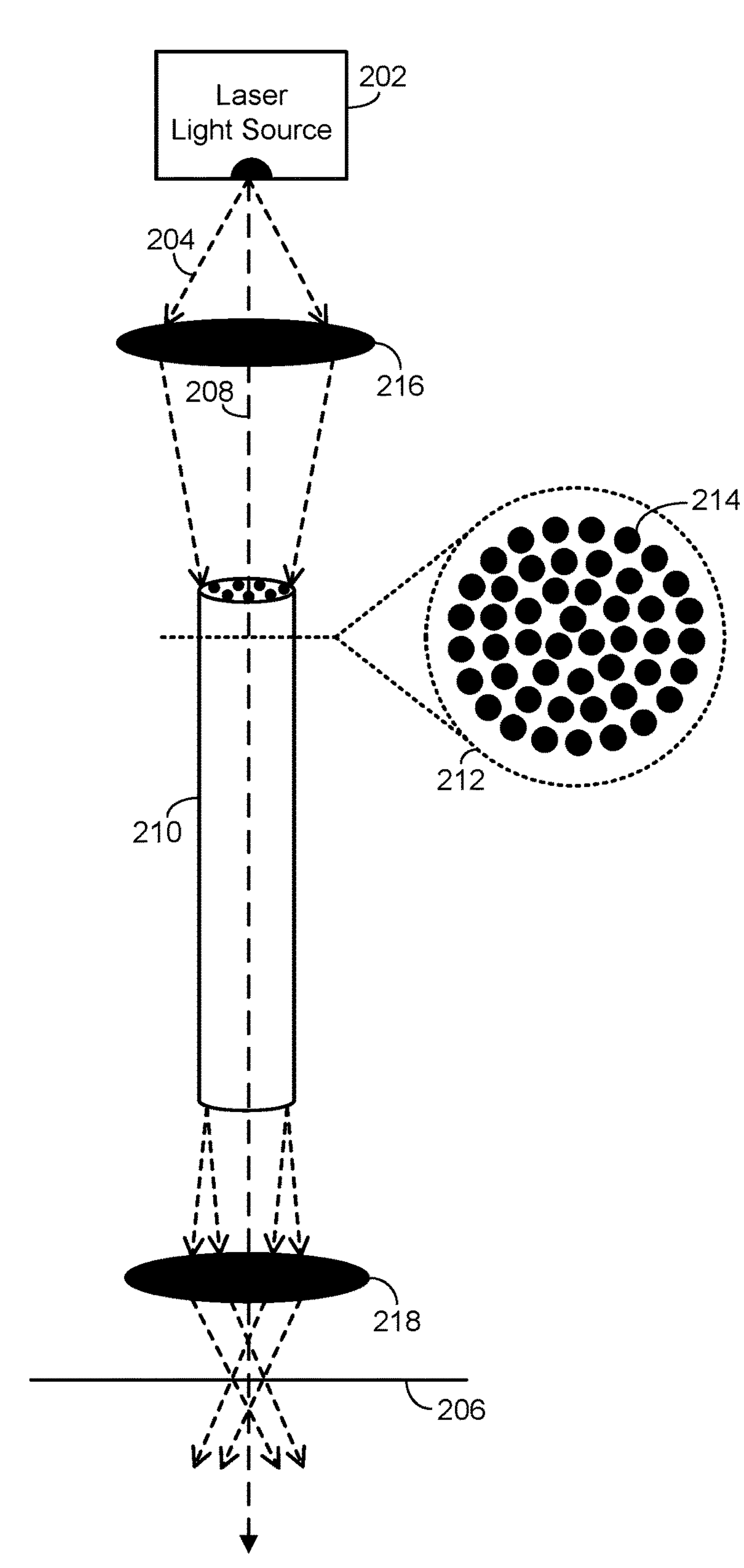
FIG. 2 schematically depicts optical components disposed along an optical path between a laser light source and a sample plane.

FIG. 2 schematically shows an example optical system 200 for use in a microscope system, such as microscope system 100 of FIG. 1. It will be understood that the optical system shown in FIG. 2 focuses on the light path between the light source and the sample for observation, and does not show any downstream optical components that may or may not be used in forming a viewable image—e.g., objective lens, phase plate, eyepieces, and/or camera optics. As shown, optical system 200 includes a laser light source 202 that emits illumination light 204 toward a sample plane 206. Various components are arranged on an optical path 208 between the laser light source and the sample plane (corresponding to the approximate position of the observation sample), as will be described in more detail below.

As used herein, a "laser light source" includes any suitable device or mechanism that produces laser light (e.g., coherent light that is substantially monochromatic) suitable for illumination of a sample during microscopic imaging. The laser light source may utilize any suitable underlying technology for producing laser light—e.g., laser technologies including gas lasers, solid-state lasers, fiber lasers, liquid lasers, or semiconductor lasers. The laser light source may be implemented as a single mode or multimode laser. The illumination light itself may have any suitable wavelength, intensity, and/or other electromagnetic properties.

In the example of FIG. 2, the illumination light 204 is propagated toward the sample plane by a plurality of optical fibers 210 disposed along the illumination path. For visual clarity, the plurality of optical fibers are represented in FIG. 2 by a cylinder, with circles at the source-proximal end of the cylinder representing the ends of individual optical fibers. FIG. 2 additionally includes a cross-sectional view 212 of the plurality of optical fibers. One of the optical fibers is labeled in the cross-sectional view as optical fiber 214.

The individual optical fibers have any suitable size and are constructed from any suitable material—e.g., plastic or glass. As will be described in more detail below, the optical fibers are in some examples longer than a coherence length of the illumination light, such that the light has substantially lost coherence by the time it reaches the observation sample. This can beneficially reduce the speckle effect associated with use of laser light sources. Each optical fiber may have any suitable diameter and numerical aperture. Furthermore, the plurality of optical fibers may include any suitable number of two or more fibers. In some examples, the plurality of optical fibers includes on the order of hundreds of optical fibers—e.g., 100 or 200. Using relatively more optical fibers may serve to further reduce the speckle pattern associated with laser light sources and produce higher-quality images.

Depending on the implementation, various other suitable optical elements may be disposed along the optical path and the sample plane. For instance, a lens may optionally be disposed between the laser light source and plurality of optical fibers. In FIG. 2, optical system 200 includes a lens 216 along the optical path, disposed between laser light source 202 and the plurality of optical fibers 210. The lens serves to focus the illumination light toward the plurality of optical fibers and facilitate in-coupling of the illumination light into the optical fibers. The lens may have any suitable size, shape, and optical properties depending on the implementation.

Similarly, in FIG. 2, the optical system includes a condenser lens 218 along the optical path, disposed between the plurality of optical fibers 210 and the sample plane 206. The condenser lens serves to direct the illumination light toward the observation sample and form a desired illumination profile for illuminating the sample—e.g., a cone of light that intersects the sample plane. As with the lens 216, the condenser lens 218 may have any suitable size, shape, and optical properties depending on the implementation.

Figure 3:
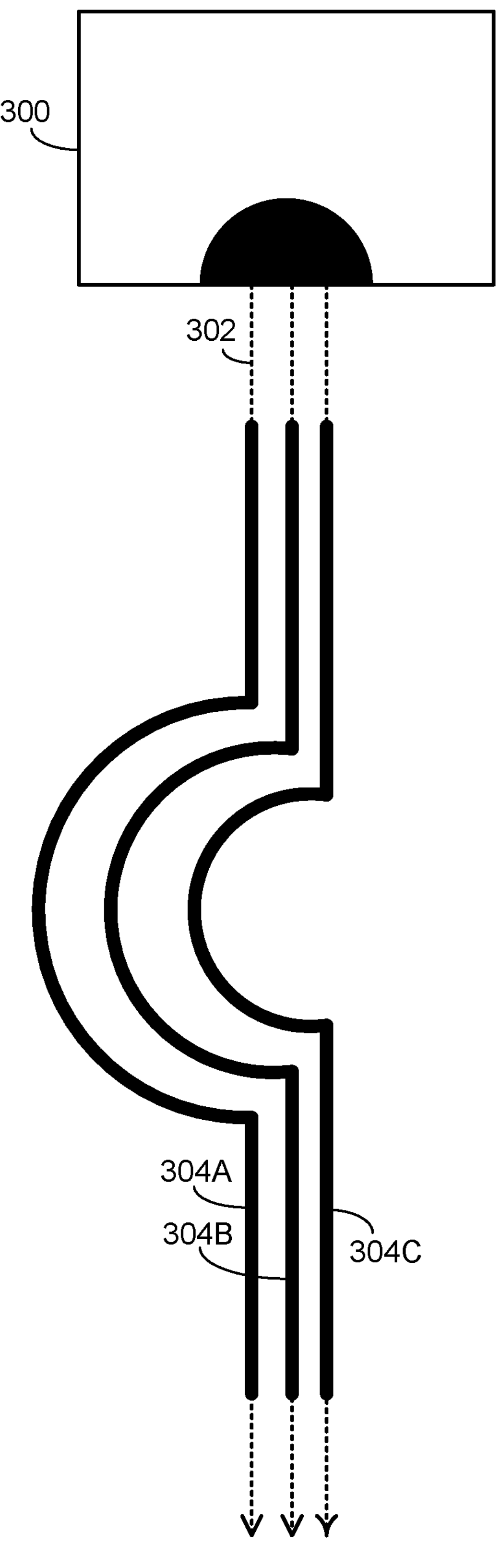
FIG. 3 schematically illustrates differing lengths of a plurality of optical fibers used to propagate illumination light.

As discussed above, the lengths of the optical fibers used to propagate the illumination light are typically longer than the coherence length of the illumination light. Furthermore, the lengths of the individual optical fibers may in some cases differ from one another. This is schematically illustrated with respect to FIG. 3, showing another example light source 300 emitting illumination light 302. The illumination light is propagated by a plurality of optical fibers, labeled as optical fiber 304A (e.g., a "first optical fiber"), optical fiber 304B (e.g., a "second optical fiber), and optical fiber 304C. As shown, the first optical fiber has a first length that differs from a second length of the second optical fiber. In some examples, this difference in length may be equal to or greater than the coherence length of the illumination light. In this manner, the illumination light propagated by the first optical fiber has substantially lost coherence with the illumination light propagated by the second optical fiber by the time it reaches the observation sample. This beneficially reduces visibility of the speckle effect formed on the observation sample, resulting in lower contrast and higher quality images.

In some examples, each optical fiber of the plurality of optical fibers differs in length from each other optical fiber. This is the case in FIG. 3, in which all three of the illustrated optical fibers differ in length. As discussed above, in some examples, each optical fiber may differ from each other optical fiber by at least the coherence length of the illumination light, such that the illumination light propagated by each fiber loses coherence with the light propagated by each other fiber.

Notably, the coherence length of the illumination light is directly related to the spectral width of the laser light source. For instance, in a case where the spectral width is approximately 20 pm, then the coherence length of the light source may be on the order of 100 mm. Accounting for the refractive index of the propagation medium (e.g., optical fiber), then the coherence length of the illumination light may be approximately 67 mm. In other words, in an example scenario where a laser light source with a spectral width of 20 pm is used, then each optical fiber may differ in length by at least 67 mm, calculated by dividing the coherence length of the light source (100 mm) by the refractive index of the optical fibers (1.5). It will be understood that these values are non-limiting examples and may vary significantly depending on the specific implementation.

The plurality of optical fibers may be bundled or otherwise grouped together in any suitable way. As discussed above, the plurality of optical fibers are in some examples bundled together in a fiber bundle having a variable cross section along the length of the bundle. In other words, a source-side cross-sectional profile of the fiber bundle (e.g., the cross section of the bundle proximate to the light source) may have a different shape, size, and/or distribution of optical fibers from the sample-side cross sectional profile of the fiber bundle (e.g., the cross section of the bundle proximate to the observation sample).

Figure 4:
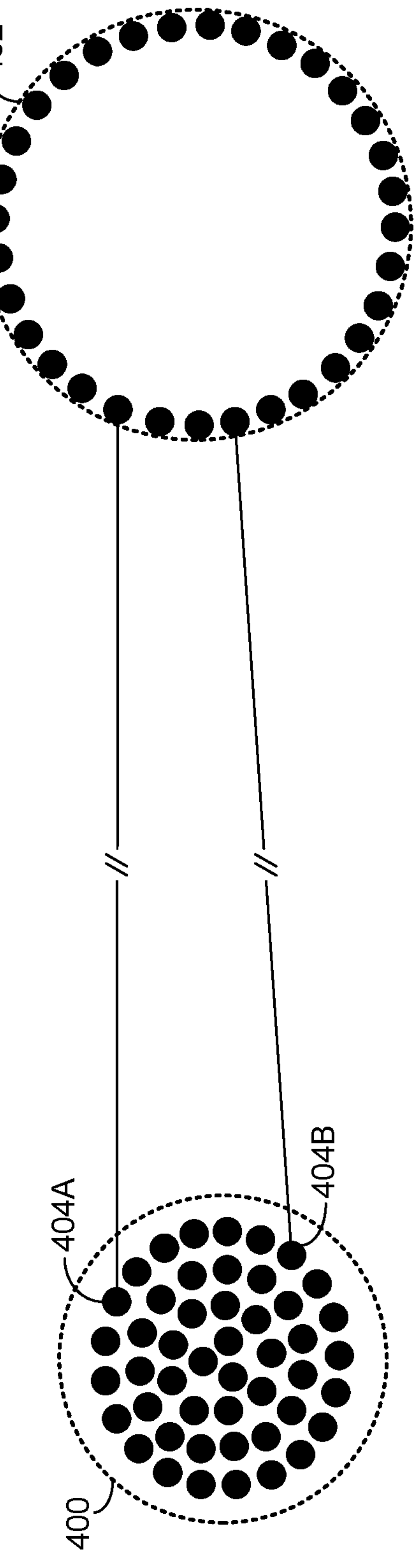
FIG. 4 schematically shows different cross-sectional profiles of a bundle of optical fibers.

This is schematically illustrated with respect to FIG. 4, which shows a source-side cross-sectional profile 400 of a bundle of optical fibers. Two individual optical fibers are labeled as fibers 404A and 404B. As shown, the plurality of optical fibers are distributed throughout the source-side cross sectional profile—e.g., fibers are present both along the edge of the cross section, and also within the interior of the cross section, without leaving significant empty space.

FIG. 4 also depicts a sample-side cross-sectional profile 402 of the bundle of optical fibers, representing an opposite end of the fiber bundle from the source-side cross-sectional profile 400. Lines extend between the source- and sample-side cross sectional profiles to indicate that the individual optical fibers extend along the length of the optical fiber bundle, beginning at the source-side cross section and ending at the sample-side cross section. Notably, in this example, the sample-side cross-sectional profile is a ring and the plurality of optical fibers are distributed along the edge of the ring. This can be used to beneficially produce an illumination profile suitable for phase contrast microscopy (e.g., a "hollow cone of light") without the use of an annulus, which significantly improves light efficiency. In some examples, the radius of the ring formed by the sample-side cross-sectional profile is set based on the focal length of a condenser lens, to thereby provide a desired numerical aperture for illumination.

It will be understood that the specific cross-sectional profiles shown in FIG. 4 are non-limiting. In general, a plurality of optical fibers (e.g., arranged as a bundle) may have any suitable cross-sectional profile, which may or may not be variable along the length of the fiber bundle. For instance, in some examples, the source- and sample-side ends of the fiber bundle may have substantially similar cross-sectional profiles—e.g., both the source- and sample-side ends may be similar to profile 400 shown in FIG. 4. This may be done, for instance, in microscope systems that are intended for conventional brightfield microscopy, rather than phase contrast microscopy.

The present disclosure has thus far focused on scenarios where a single set of optical fibers are used to propagate the illumination light. In some examples, however, the microscope system may additionally include a second plurality of optical fibers disposed along the illumination path between the first plurality of optical fibers and the observation sample. In other words, the two sets of optical fibers are arranged in series along the optical path. In this manner, the illumination light is propagated toward the observation sample by the first plurality of optical fibers and the second plurality of optical fibers.

Figure 5:
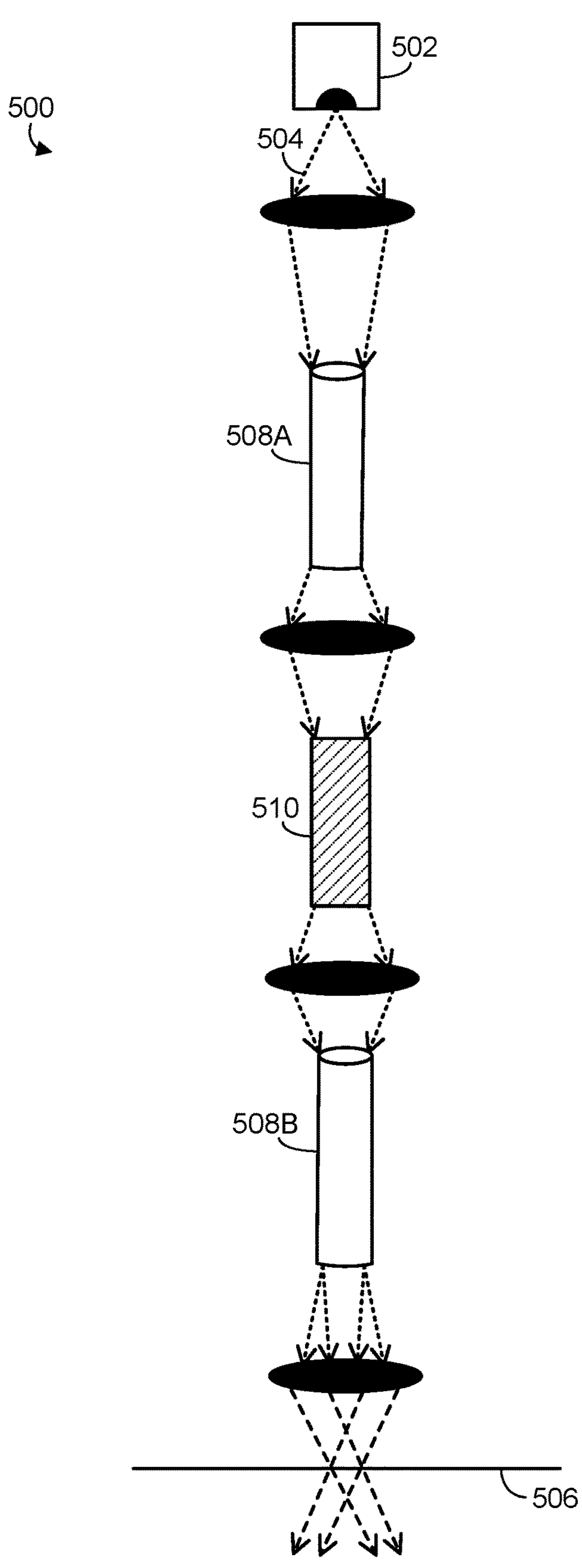
FIG. 5 schematically depicts another example arrangement of optical components disposed along an optical path.

This scenario is schematically illustrated with respect to FIG. 5, showing another example optical system 500. A laser light source 502 emits illumination light 504 toward a sample plane 506. In this example, the optical system includes a first plurality of optical fibers 508A and a second plurality of optical fibers 508B arranged in series, such that the illumination light is propagated by both sets of optical fibers 508A and 508B toward the observation sample. This arrangement can beneficially reduce the random speckling effect associated with use of laser light while also reducing the diameter of each fiber bundle. In other words, the number of each individual optical fibers in each bundle can be reduced as compared to cases where only one bundle of optical fibers is used, while further reducing the laser speckling effect.

In cases where two bundles of optical fibers are used, the optical system may include a mode mixing element along the illumination path, disposed between the first plurality of optical fibers and the second plurality of optical fibers. This is also shown in FIG. 5, in which a mode mixing optical element 510 is shown between the first set of optical fibers 508A and the second set of optical fibers 508B. The mode mixing optical element takes any suitable form. As non-limiting examples, it may be implemented as a square core fiber or a hexagonal rod.

In FIG. 5, various lenses are disposed along the optical path between the laser light source and the sample plane. It will be understood that at least some of these lenses may be omitted in other embodiments. For instance, the lens between the light source and first set of optical fibers 508A may be omitted, the lens between the first set of optical fibers and the mode mixing optical element 510 may be omitted, and/or the lens between the mode mixing optical element and the second set of optical fibers 508B may be omitted, in some examples.

Notably, while FIG. 5 shows two different sets of optical fibers with a mode mixing optical element disposed between them, it will be understood that this is non-limiting. Rather, in other examples, any suitable number of one or more sets of optical fibers may be used. In other words, in some examples, three or more sets of optical fibers may be used. In general, the improvement in image quality (e.g., reduction in speckling) scales to the Nth power with N sets of optical fibers. For instance, three sets of optical fibers each having ten individual fibers provides a similar effect to one set of optical fibers having 1000 individual fibers—e.g., 1000^1=10^3.

In cases where two or more sets of optical fibers are used, then the lengths of the individual optical fibers should be set such that no combination of possible paths through the different fibers yields a same total length. In one example scenario where three sets of optical fibers are used, each set includes ten fibers, and the difference in length between fibers is d, the longest fiber of the first set of fibers is equal to d*10. For the second set of optical fibers, the step size (e.g., difference in length between two fibers) is equal to the length of the longest fiber of the first set. In other words, the longest fiber in the second set would be d*10*10=d*100. Similarly, the step size for the third set of optical fibers is equal to the length of the longest fiber in the second set. In other words, the longest fiber in the third set would be d*10*10*10=d*1000. In this arrangement, the longest individual fiber in the overall optical system would have the same length as the longest fiber in an alternate arrangement where only one set of optical fibers is used, having 1000 total individual fibers, while providing the same degree of image contrast improvement.

Figure 6:
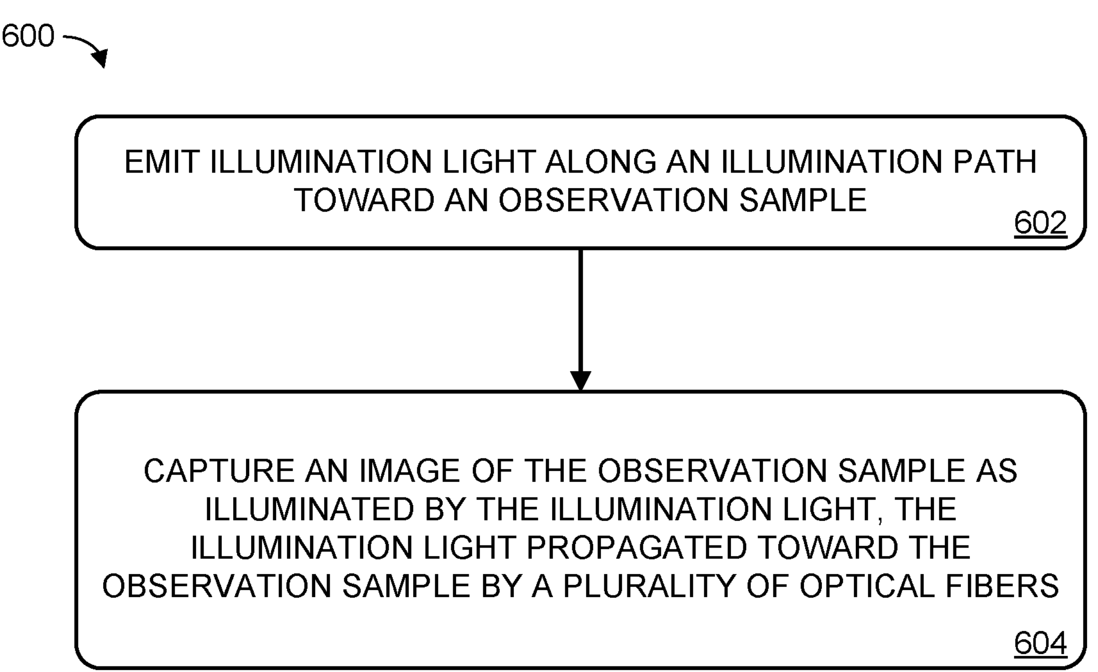
FIG. 6 illustrates an example method for microscopic imaging.

FIG. 6 illustrates an example method 600 for microscopic imaging. Steps of method 600 may be performed by any suitable computing system of one or more computing devices. As one non-limiting example, method 600 may be implemented at least partially by a controller of a microscope system, such as controller 110 shown in FIG. 1. Steps of method 600 may be initiated, terminated, and/or repeated at any suitable time and in response to any suitable condition. In some examples, method 600 is implemented as computing system 700 described below with respect to FIG. 7.

At 602, method 600 includes, at a laser light source of a microscope system, emitting illumination light along an optical path toward an observation sample. As discussed above, both the illumination light and the laser light source have any suitable properties depending on the implementation. For instance, the illumination light may have any suitable intensity, wavelength, coherence length, etc.

At 604, method 600 includes, at a camera of the microscope system, capturing an image of the observation sample as illuminated by the illumination light. As discussed above, the illumination light is propagated from the laser light source toward the observation sample at least partially through a plurality of optical fibers. This beneficially reduces the coherence of the illumination light before it reaches the observation sample, which reduces the random speckle effect and results in a higher quality image.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
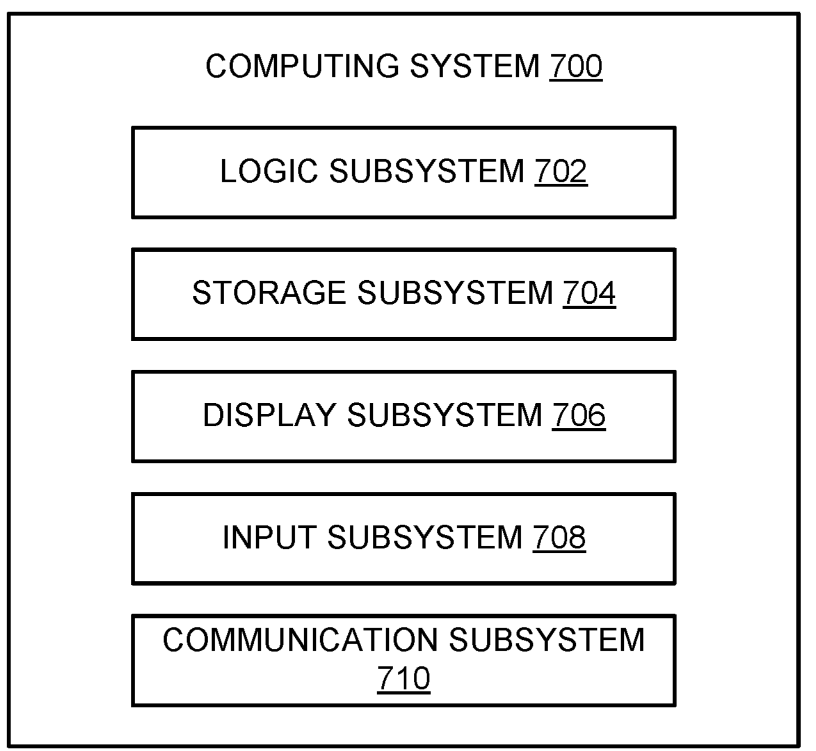
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, and/or other computing devices. Computing system 700 may be integrated into, or otherwise used to control behavior of, a microscope system as described above.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a microscope system comprises: a laser light source to emit illumination light toward an observation sample; and a plurality of optical fibers disposed along an optical path between the laser light source and the observation sample, such that each optical fiber of the plurality of optical fibers propagates illumination light toward the observation sample, wherein each optical fiber of the plurality of optical fibers has a length greater than a coherence length of the illumination light, and wherein a first optical fiber of the plurality of optical fibers has a first length that differs from a second length of a second optical fiber by at least the coherence length. In this example or any other example, the microscope system is a phase contrast microscope. In this example or any other example, the plurality of optical fibers are arranged together as a fiber bundle, and wherein a source-side cross-sectional profile of the fiber bundle has a different shape from a sample-side cross-sectional profile of the fiber bundle. In this example or any other example, the sample-side cross-sectional profile is a ring and the plurality of optical fibers are distributed along an edge of the ring, and wherein the plurality of optical fibers are distributed throughout the source-side cross sectional profile to in-couple illumination light from the laser light source. In this example or any other example, each optical fiber of the plurality of optical fibers differs in length from each other optical fiber of the plurality of optical fibers by at least the coherence length. In this example or any other example, the microscope system further comprises a lens along the optical path, the lens disposed between the laser light source and the plurality of optical fibers, such that the lens focuses the illumination light toward the plurality of optical fibers. In this example or any other example, the microscope system further comprises a condenser lens along the optical path, the condenser lens disposed between the plurality of optical fibers and the observation sample, such that the condenser lens directs the illumination light toward the observation sample. In this example or any other example, the plurality of optical fibers is a first plurality of optical fibers, and wherein the microscope system includes a second plurality of optical fibers along the optical path, the second plurality of optical fibers disposed between the first plurality of optical fibers and the observation sample, such that the illumination light is propagated toward the observation sample by the first plurality of optical fibers and the second plurality of optical fibers. In this example or any other example, the microscope system further comprises a mode-mixing optical element along the optical path, the mode mixing optical element disposed between the first plurality of optical fibers and the second plurality of optical fibers. In this example or any other example, the microscope system further comprises a camera to capture and output images of the observation sample as illuminated by the illumination light.

In an example, a method for microscopic imaging comprises: at a laser light source of a microscope system, emitting illumination light along an optical path toward an observation sample; and at a camera of the microscope system, capturing an image of the observation sample as illuminated by the illumination light, wherein the illumination light is propagated toward the observation sample by a plurality of optical fibers disposed along the optical path, such that each optical fiber of the plurality of optical fibers propagates illumination light toward the observation sample, wherein each optical fiber of the plurality of optical fibers is longer than a coherence length of the illumination light, and wherein a first optical fiber of the plurality of optical fibers has a first length that differs from a second length of a second optical fiber by at least the coherence length. In this example or any other example, the microscope system includes a phase contrast microscope. In this example or any other example, the plurality of optical fibers are arranged together as a fiber bundle, and wherein a source-side cross-sectional profile of the fiber bundle has a different shape from a sample-side cross-sectional profile of the fiber bundle. In this example or any other example, the sample-side cross-sectional profile is a ring and the plurality of optical fibers are distributed along an edge of the ring, and wherein the plurality of optical fibers are distributed throughout the source-side cross sectional profile to in-couple illumination light from the laser light source. In this example or any other example, each optical fiber of the plurality of optical fibers differs in length from each other optical fiber of the plurality of optical fibers by at least the coherence length. In this example or any other example, the plurality of optical fibers is a first plurality of optical fibers, and wherein the microscope system includes a second plurality of optical fibers along the optical path, the second plurality of optical fibers disposed between the first plurality of optical fibers and the observation sample, such that the illumination light is propagated toward the observation sample by the first plurality of optical fibers and the second plurality of optical fibers. In this example or any other example, the microscope system further comprises a mode mixing optical element along the optical path, the mode-mixing optical element disposed between the first plurality of optical fibers and the second plurality of optical fibers.

In an example, a phase contrast microscope system comprises: a laser light source to emit illumination light toward an observation sample; a bundle of optical fibers disposed along an illumination light path between the laser light source and the observation sample, such that each optical fiber of the bundle of optical fibers propagates illumination light toward the observation sample, and a source-side cross-sectional profile of the fiber bundle has a different shape from a sample-side cross-sectional profile of the fiber bundle, wherein each optical fiber of the plurality of optical fibers is longer than a coherence length of the illumination light, and wherein each optical fiber of the plurality of optical fibers differs in length from each other optical fiber of the plurality of optical fibers by at least the coherence length; and a camera to capture and output images of the observation sample as illuminated by the illumination light. In this example or any other example, the sample-side cross-sectional profile is a ring and the plurality of optical fibers are distributed along an edge of the ring, and wherein the plurality of optical fibers are distributed throughout the source-side cross sectional profile to in-couple illumination light from the laser light source. In this example or any other example, the plurality of optical fibers is a first plurality of optical fibers, and wherein the microscope system includes a second plurality of optical fibers along the optical path, the second plurality of optical fibers disposed between the first plurality of optical fibers and the observation sample, such that the illumination light is propagated toward the observation sample by the first plurality of optical fibers and the second plurality of optical fibers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A microscope system, comprising:

a laser light source to emit illumination light;

a first plurality of optical fibers including at least two optical fibers disposed along an optical path between the laser light source and an observation sample, such that each optical fiber of the first plurality of optical fibers propagates the illumination light toward the observation sample, wherein each optical fiber of the first plurality of optical fibers has a length greater than a coherence length of the illumination light, and wherein a first optical fiber of the first plurality of optical fibers has a first length that differs from a second length of a second optical fiber of the first plurality of optical fibers by at least the coherence length; and a second plurality of optical fibers including at least two optical fibers disposed between the first plurality of optical fibers and the observation sample along the optical path;

wherein the first plurality of optical fibers and the second plurality of optical fibers collectively define a plurality of light paths of the illumination light along the optical path in which each light path includes one optical fiber of the first plurality of optical fibers and one optical fiber of the second plurality of optical fibers;

wherein each light path of the plurality of light paths has a total length that differs from the total length of one or more other light paths of the plurality of light paths.

2. The microscope system of claim 1, wherein each optical fiber of the first plurality of optical fibers differs in length from each other optical fiber of the first plurality of optical fibers by at least the coherence length.

3. The microscope system of claim 1, further comprising a lens along the optical path, the lens disposed between the laser light source and the first plurality of optical fibers, such that the lens focuses the illumination light toward the first plurality of optical fibers.

4. The microscope system of claim 1, further comprising a condenser lens along the optical path, the condenser lens disposed between the first plurality of optical fibers and the observation sample, such that the condenser lens directs the illumination light toward the observation sample.

5. The microscope system of claim 1, further comprising a mode mixing optical element along the optical path, the mode mixing optical element disposed between the first plurality of optical fibers and the second plurality of optical fibers.

6. The microscope system of claim 1, further comprising a camera to capture and output images of the observation sample as illuminated by the illumination light.

7. The microscope system of claim 1, wherein the microscope system is a phase contrast microscope.

8. The microscope system of claim 7, wherein the first plurality of optical fibers are arranged together as a fiber bundle, and wherein a source-side cross-sectional profile of the fiber bundle has a different shape from a sample-side cross-sectional profile of the fiber bundle.

9. The microscope system of claim 8, wherein the sample-side cross-sectional profile is a ring and the first plurality of optical fibers are distributed along an edge of the ring, and wherein the first plurality of optical fibers are distributed throughout the source-side cross sectional profile to in-couple illumination light from the laser light source.

10. A method for microscopic imaging, the method comprising:

at a laser light source of a microscope system, emitting illumination light along an optical path toward an observation sample; and at a camera of the microscope system, capturing an image of the observation sample as illuminated by the illumination light, wherein:

the illumination light is propagated toward the observation sample by a first plurality of optical fibers disposed along the optical path, such that each optical fiber of the first plurality of optical fibers propagates illumination light toward the observation sample, wherein each optical fiber of the first plurality of optical fibers is longer than a coherence length of the illumination light, and wherein a first optical fiber of the first plurality of optical fibers has a first length that differs from a second length of a second optical fiber of the first plurality of optical fibers by at least the coherence length;

the illumination light is propagated toward the observation sample by a second plurality of optical fibers including at least two optical fibers disposed between the first plurality of optical fibers and the observation sample along the optical path;

the first plurality of optical fibers and the second plurality of optical fibers collectively define a plurality of light paths of the illumination light along the optical path in which each light path includes one optical fiber of the first plurality of optical fibers and one optical fiber of the second plurality of optical fibers; and each light path of the plurality of light paths has a total length that differs from the total length of one or more other light paths of the plurality of light paths.

11. The method of claim 10, wherein each optical fiber of the first plurality of optical fibers differs in length from each other optical fiber of the first plurality of optical fibers by at least the coherence length.

12. The method of claim 10, wherein the microscope system further comprises a mode mixing optical element along the optical path, the mode mixing optical element disposed between the first plurality of optical fibers and the second plurality of optical fibers.

13. The method of claim 10, wherein the microscope system includes a phase contrast microscope.

14. The method of claim 13, wherein the first plurality of optical fibers are arranged together as a fiber bundle, and wherein a source-side cross-sectional profile of the fiber bundle has a different shape from a sample-side cross-sectional profile of the fiber bundle.

15. The method of claim 14, wherein the sample-side cross-sectional profile is a ring and the first plurality of optical fibers are distributed along an edge of the ring, and wherein the first plurality of optical fibers are distributed throughout the source-side cross sectional profile to in-couple illumination light from the laser light source.

16. A phase contrast microscope system, comprising:

a laser light source to emit illumination light;

a first plurality of optical fibers disposed along an optical path between the laser light source and an observation sample, such that each optical fiber of the first plurality of optical fibers propagates illumination light toward the observation sample, and a source-side cross-sectional profile of the first plurality of optical fibers has a different shape from a sample-side cross-sectional profile of the first plurality of optical fibers, wherein each optical fiber of the first plurality of optical fibers is longer than a coherence length of the illumination light, and wherein each optical fiber of the first plurality of optical fibers differs in length from each other optical fiber of the first plurality of optical fibers by at least the coherence length; and a second plurality of optical fibers including at least two optical fibers disposed between the first plurality of optical fibers and the observation sample along the optical path;

wherein the first plurality of optical fibers and the second plurality of optical fibers collectively define a plurality of light paths of the illumination light along the optical path in which each light path includes one optical fiber of the first plurality of optical fibers and one optical fiber of the second plurality of optical fibers;

wherein each light path of the plurality of light paths has a total length that differs from the total length of one or more other light paths of the plurality of light paths; and a camera to capture and output images of the observation sample as illuminated by the illumination light.

17. The phase contrast microscope system of claim 16, wherein the sample-side cross-sectional profile is a ring and the first plurality of optical fibers are distributed along an edge of the ring, and wherein the first plurality of optical fibers are distributed throughout the source-side cross sectional profile to in-couple illumination light from the laser light source.

18. The phase contrast microscope system of claim 16, further comprising a mode mixing optical element disposed along the optical path between the first plurality of optical fibers and the second plurality of optical fibers.

* * * * *